(12) United States Patent  
Campos, II et al.

(10) Patent No.: US 10,362,833 B2
(45) Date of Patent: Jul. 30, 2019

(54) BLADDER ELEMENT FORMED FROM THREE SHEETS AND METHOD OF MANUFACTURING A BLADDER ELEMENT

(71) Applicant: NIKE, Inc., Beaverton, OR (US)

(72) Inventors: Fidencio Campos, II, Dallas, OR (US); Zachary M. Elder, Portland, OR (US); Benjamin J. Monfils, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/553,028

(22) PCT Filed: Apr. 20, 2016

(86) PCT No.: PCT/US2016/028384
§ 371 (c)(1),
(2) Date: Aug. 23, 2017

(87) PCT Pub. No.: WO2016/172169
PCT Pub. Date: Oct. 27, 2016

(65) Prior Publication Data
US 2018/0070675 A1  Mar. 15, 2018

Related U.S. Application Data

(60) Provisional application No. 62/150,503, filed on Apr. 21, 2015, provisional application No. 62/150,507, filed on Apr. 21, 2015.

(51) Int. Cl.
*A43B 13/20* (2006.01)
*A43B 13/02* (2006.01)
(Continued)

(52) U.S. Cl.
CPC ............ *A43B 13/20* (2013.01); *A43B 13/023* (2013.01); *A43B 13/189* (2013.01);
(Continued)

(58) Field of Classification Search
CPC ........ A43B 13/20; A43B 13/023; A43B 17/03
(Continued)

(56) References Cited

U.S. PATENT DOCUMENTS 2,269,342 A   1/1942   Johnson
2,677,906 A   5/1954   Reed
(Continued)

FOREIGN PATENT DOCUMENTS

CN   101919607 A   12/2010
EP   0771694 A2    5/1997
(Continued)

OTHER PUBLICATIONS

International Search Report and Written Opinion for Application No. PCT/US2016/028384, dated Jul. 8, 2016.
(Continued)

*Primary Examiner* — Marie D Bays
(74) *Attorney, Agent, or Firm* — Quinn IP Law

(57) ABSTRACT

A method of manufacturing a bladder element comprises forming at least one of a first, a second, and a third polymeric sheet to have a contoured surface profile. The first, the second, and the third polymeric sheets are stacked so that the second polymeric sheet is between the first polymeric sheet and the third polymeric sheet. The method comprises applying fluid pressure between the first polymeric sheet and second polymeric sheet, between the second polymeric sheet and the third polymeric sheet, or between both, forcing a first surface of the second polymeric sheet into contact with an inner surface of the first polymeric sheet, or a second surface of the second polymeric sheet into contact with an inner surface of the third polymeric sheet, or both. A bladder element is also disclosed.

15 Claims, 5 Drawing Sheets

(51) Int. Cl.

| | | |
|---|---|---|
| *A43B 13/18* | (2006.01) | |
| *B29D 35/12* | (2010.01) | |
| *B29C 51/26* | (2006.01) | |
| *B29C 65/14* | (2006.01) | |
| *B29C 65/48* | (2006.01) | |
| *B29C 65/00* | (2006.01) | |
| *B29D 35/14* | (2010.01) | |
| *B32B 7/02* | (2019.01) | |
| *B32B 27/08* | (2006.01) | |
| *B32B 27/30* | (2006.01) | |
| *B32B 27/40* | (2006.01) | |
| *B29K 23/00* | (2006.01) | |
| *B29K 75/00* | (2006.01) | |
| *B29K 105/00* | (2006.01) | |
| *B29L 31/50* | (2006.01) | |

(52) U.S. Cl.
CPC ............ *B29C 51/266* (2013.01); *B29C 65/14* (2013.01); *B29C 65/48* (2013.01); *B29C 66/438* (2013.01); *B29D 35/122* (2013.01); *B29D 35/14* (2013.01); *B32B 7/02* (2013.01); *B32B 27/08* (2013.01); *B32B 27/306* (2013.01); *B32B 27/40* (2013.01); *B29K 2023/083* (2013.01); *B29K 2075/00* (2013.01); *B29K 2105/256* (2013.01); *B29L 2031/504* (2013.01); *B32B 2250/05* (2013.01); *B32B 2250/24* (2013.01); *B32B 2250/42* (2013.01); *B32B 2437/00* (2013.01)

(58) Field of Classification Search
USPC .................................. 12/146 B, 142 R; 36/29
See application file for complete search history.

(56) References Cited

U.S. PATENT DOCUMENTS

| | | | |
|---|---|---|---|
| 2,762,134 A | 9/1956 | Town | |
| 3,110,971 A | 11/1963 | Chang | |
| 3,469,576 A | 9/1969 | Smith et al. | |
| 3,568,227 A | 3/1971 | Dunham | |
| 4,183,156 A | 1/1980 | Rudy | |
| 4,219,945 A | 9/1980 | Rudy | |
| 4,547,919 A | 10/1985 | Wang | |
| 4,779,359 A | 10/1988 | Famolare, Jr. | |
| 4,817,304 A | 4/1989 | Parker et al. | |
| 4,936,029 A | 6/1990 | Rudy | |
| 4,999,931 A * | 3/1991 | Vermeulen | A43B 13/185 |
| | | | 36/153 |
| 5,042,176 A | 8/1991 | Rudy | |
| 5,067,252 A | 11/1991 | Baillie | |
| 5,220,737 A | 6/1993 | Edington | |
| 5,343,638 A * | 9/1994 | Legassie | A43B 3/0005 |
| | | | 36/28 |
| 5,564,202 A | 10/1996 | Hoppenstein | |
| 5,575,088 A | 11/1996 | Allen et al. | |
| 5,713,141 A | 2/1998 | Mitchell et al. | |
| 5,952,065 A | 9/1999 | Mitchell et al. | |
| 5,979,078 A | 11/1999 | McLaughlin | |
| 5,985,383 A | 11/1999 | Allen et al. | |
| 5,987,781 A | 11/1999 | Pavesi et al. | |
| 6,006,448 A * | 12/1999 | Hellman | A43B 3/106 |
| | | | 36/10 |
| 6,009,637 A | 1/2000 | Pavone | |
| 6,013,340 A | 1/2000 | Bonk et al. | |
| 6,029,962 A * | 2/2000 | Shorten | A43B 13/181 |
| | | | 267/145 |
| 6,041,519 A | 3/2000 | Cheng | |
| 6,082,025 A | 7/2000 | Bonk et al. | |
| 6,098,313 A * | 8/2000 | Skaja | A43B 13/181 |
| | | | 36/28 |
| 6,127,026 A | 10/2000 | Bonk et al. | |
| 6,203,868 B1 | 3/2001 | Bonk et al. | |
| 6,321,465 B1 | 11/2001 | Bonk et al. | |
| 6,402,879 B1 * | 6/2002 | Tawney | A43B 13/20 |
| | | | 156/285 |
| 6,503,355 B1 | 1/2003 | Anzani et al. | |
| 6,510,624 B1 * | 1/2003 | Lakic | A43B 5/0407 |
| | | | 36/28 |
| 6,516,540 B2 | 2/2003 | Seydel et al. | |
| 6,537,639 B1 | 3/2003 | Huang | |
| 6,571,490 B2 * | 6/2003 | Tawney | A43B 13/20 |
| | | | 36/29 |
| 6,751,892 B2 | 6/2004 | Chavet et al. | |
| 6,971,193 B1 | 12/2005 | Potter et al. | |
| 6,976,321 B1 * | 12/2005 | Lakic | A43B 7/141 |
| | | | 36/28 |
| 7,204,041 B1 | 4/2007 | Bailey, Sr. et al. | |
| 7,244,483 B2 | 7/2007 | Tawney et al. | |
| 7,437,835 B2 | 10/2008 | Marvin et al. | |
| 7,451,555 B1 * | 11/2008 | Lakic | A43B 7/141 |
| | | | 36/29 |
| 7,588,654 B2 * | 9/2009 | Schindler | A43B 13/20 |
| | | | 156/147 |
| 7,694,438 B1 | 4/2010 | Christensen et al. | |
| 7,707,743 B2 * | 5/2010 | Schindler | A43B 1/0009 |
| | | | 36/25 R |
| 7,779,558 B2 | 8/2010 | Nishiwaki et al. | |
| 7,788,824 B2 | 9/2010 | Hann | |
| 7,802,378 B2 | 9/2010 | Harmon Weiss et al. | |
| 8,122,615 B2 | 2/2012 | Lucas et al. | |
| 8,125,796 B2 | 2/2012 | Ellis | |
| 8,256,147 B2 | 9/2012 | Ellis | |
| 8,635,786 B2 | 1/2014 | Aveni et al. | |
| 8,656,608 B2 | 2/2014 | Goodwin et al. | |
| 8,848,368 B2 | 9/2014 | Ellis | |
| 9,380,832 B2 * | 7/2016 | Smith | A43B 13/189 |
| 9,510,646 B2 * | 12/2016 | Holt | A43B 13/189 |
| 9,603,415 B2 * | 3/2017 | Taylor | B29D 35/122 |
| 2001/0042321 A1 * | 11/2001 | Tawney | A43B 13/20 |
| | | | 36/29 |
| 2002/0121031 A1 | 9/2002 | Smith et al. | |
| 2003/0097767 A1 | 5/2003 | Perkinson | |
| 2003/0183324 A1 | 10/2003 | Tawney et al. | |
| 2004/0031170 A1 * | 2/2004 | Chi | A43B 1/0009 |
| | | | 36/29 |
| 2004/0148809 A1 | 8/2004 | Kikuta et al. | |
| 2004/0154189 A1 * | 8/2004 | Wang | A43B 13/026 |
| | | | 36/28 |
| 2005/0132607 A1 * | 6/2005 | Dojan | A43B 13/20 |
| | | | 36/29 |
| 2006/0137221 A1 | 6/2006 | Dojan et al. | |
| 2007/0256326 A1 | 11/2007 | Jarvis | |
| 2007/0294832 A1 | 12/2007 | Shiao | |
| 2009/0151196 A1 | 6/2009 | Schindler et al. | |
| 2009/0178301 A1 * | 7/2009 | Dojan | A43B 13/20 |
| | | | 36/29 |
| 2009/0178302 A1 | 7/2009 | Kim | |
| 2009/0183387 A1 | 7/2009 | Ellis | |
| 2009/0293305 A1 | 12/2009 | Pelsue et al. | |
| 2010/0094184 A1 | 4/2010 | Wong et al. | |
| 2010/0319214 A1 | 12/2010 | Issler | |
| 2011/0162232 A1 | 7/2011 | Gazzara et al. | |
| 2011/0162233 A1 | 7/2011 | Shiao | |
| 2012/0260524 A1 | 10/2012 | Izquieta Anaut | |
| 2013/0167402 A1 | 7/2013 | Christensen et al. | |
| 2013/0174447 A1 | 7/2013 | Sills | |
| 2013/0227858 A1 | 9/2013 | James | |
| 2014/0090189 A1 | 4/2014 | Parker | |
| 2014/0230272 A1 | 8/2014 | Feshbach et al. | |
| 2014/0230276 A1 | 8/2014 | Campos, II et al. | |
| 2014/0250728 A1 | 9/2014 | Devoe et al. | |
| 2014/0283413 A1 | 9/2014 | Christensen et al. | |
| 2016/0295967 A1 | 10/2016 | Campos, II et al. | |
| 2016/0295968 A1 | 10/2016 | Campos, II et al. | |

FOREIGN PATENT DOCUMENTS

| | | |
|---|---|---|
| EP | 0780064 A2 | 6/1997 |
| EP | 1278434 A2 | 1/2003 |
| JP | 2002238613 A | 8/2002 |

(56) References Cited

FOREIGN PATENT DOCUMENTS

| WO | 9111931 A1 | 8/1991 |
|---|---|---|
| WO | 0170060 A2 | 9/2001 |
| WO | 2017079255 A1 | 5/2017 |

OTHER PUBLICATIONS

American Society for Testing and Materials (ASTM) Standard 01003-00, Standard Test Method for Haze and Luminous Transmittance of Transparent Plastics, Jul. 2000, Book of Standards vol. 08.01, ASTM International, Pennsylvania, USA.

* cited by examiner

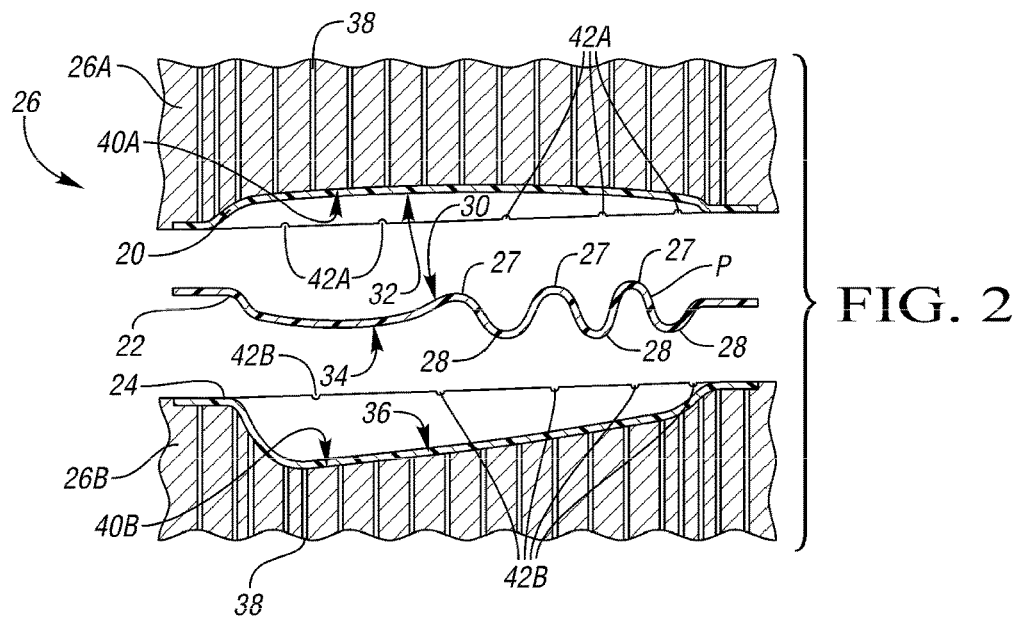
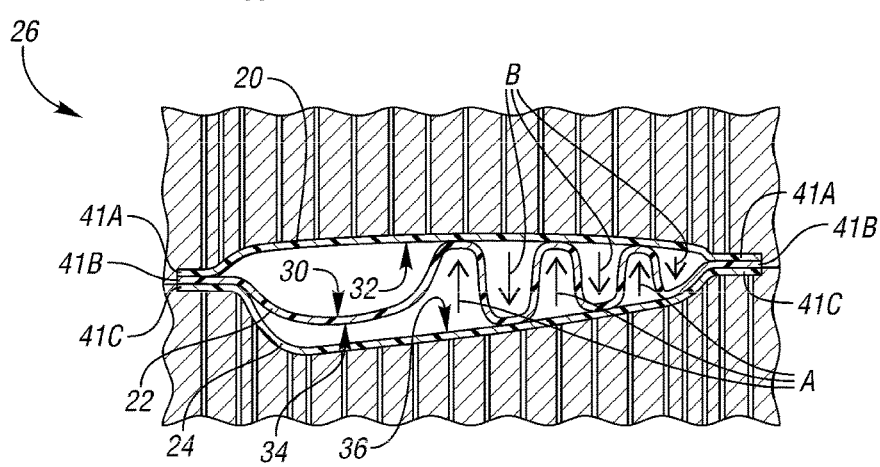
FIG. 3
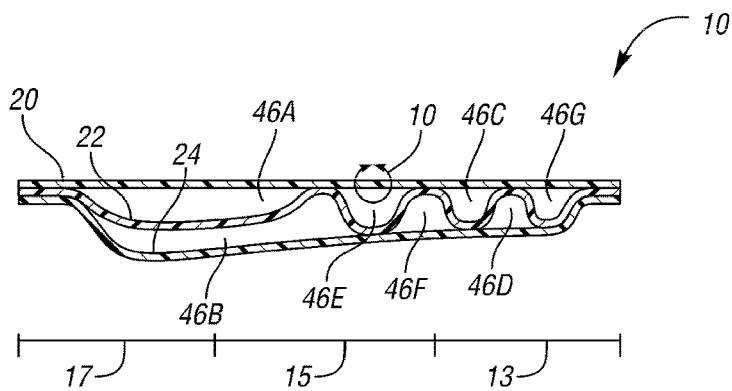
FIG. 4

US 10,362,833 B2

1

BLADDER ELEMENT FORMED FROM THREE SHEETS AND METHOD OF MANUFACTURING A BLADDER ELEMENT

CROSS-REFERENCE TO RELATED APPLICATIONS

This application claims the benefit of and is a National Stage entry of International Patent Application No. PCT/US2016/028384, filed Apr. 20, 2016, which claims the benefit under 35 U.S.C. 119(e) of priority to United States Provisional Application No. 62/150,507, filed Apr. 21, 2015, and to United States Provisional Application No. 62/150,503, filed Apr. 21, 2015, both of which are incorporated by reference in their entirety.

TECHNICAL FIELD

The present teachings generally include a bladder element, and a method of manufacturing a bladder element.

BACKGROUND

Footwear typically includes a sole configured to be located under a wearer's foot to space the foot away from the ground or floor surface. Footwear sometimes utilizes polyurethane foam or other resilient materials in the sole to provide cushioning. A fluid-filled bladder element is sometimes included in the sole to provide desired cushioning.

BRIEF DESCRIPTION OF THE DRAWINGS

FIG. 2 is a schematic cross-sectional and fragmentary illustration in exploded view of a mold assembly and the bladder element of FIG. 1.

FIG. 3 is a schematic cross-sectional and fragmentary illustration of the mold assembly of FIG. 2 in a closed position forming the bladder element of FIG. 1.

FIG. 4 is a schematic cross-sectional illustration of the bladder element of FIG. 1 taken at lines 4-4 in FIG. 1.

DESCRIPTION

Figure 1:
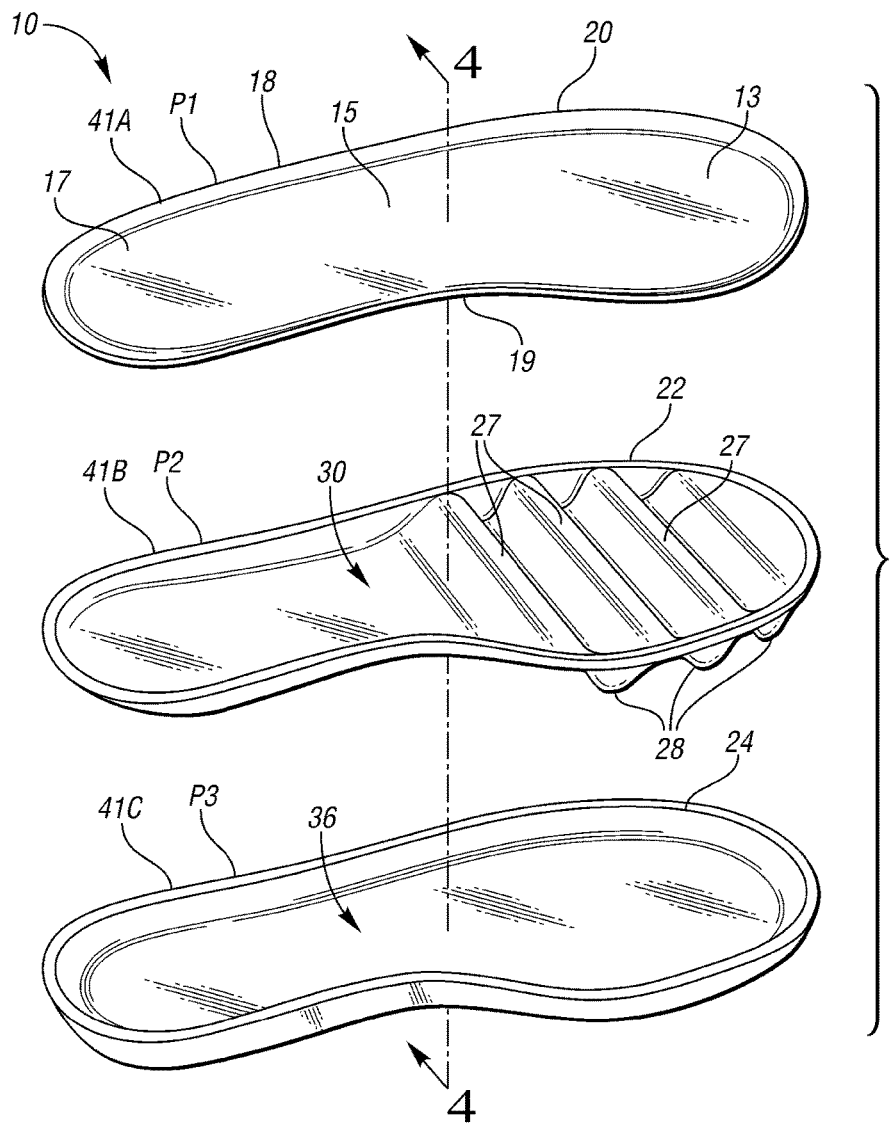
FIG. 1 is a schematic illustration in exploded perspective view of an embodiment of a bladder element for an article of footwear.

A method of manufacturing a bladder element comprises forming at least one of a first polymeric sheet, a second polymeric sheet, or a third polymeric sheet to have a contoured surface profile, and, after said forming, stacking the first polymeric sheet, the second polymeric, and the third polymeric sheet so that the second polymeric sheet is between the first polymeric sheet and the third polymeric sheet. In an embodiment, the three polymeric sheets may be coextensive when stacked.

The method also comprises applying fluid pressure in the mold assembly between the first polymeric sheet and second polymeric sheet, forcing a second surface of the second polymeric sheet into contact with an inner surface of the third polymeric sheet. Alternatively, or in addition, the method may comprise applying fluid pressure between the second polymeric sheet and the third polymeric sheet, forcing a first surface of the second polymeric sheet into contact with an inner surface of the first polymeric sheet.

Forming at least one of the first polymeric sheet, the second polymeric sheet, or the third polymeric sheet to have a contoured surface profile may comprise forming each of the first polymeric sheet, the second polymeric sheet, and the third polymeric sheet such that each of the first polymeric sheet, the second polymeric sheet, and the third polymeric sheet have a respective contoured surface profile.

In one embodiment, forming at least one of the first polymeric sheet, the second polymeric sheet, or the third polymeric sheet to have a contoured surface profile is by thermoforming.

The method may comprise securing a flange at a perimeter of at least one of the first polymeric sheet, the second polymeric sheet, or the third polymeric sheet, to a flange at a perimeter of another of the first polymeric sheet, the second polymeric sheet, or the third polymeric sheet by at least one of compression, radio-frequency welding, thermal bonding, or adhesive.

In an embodiment, forming at least one of the first polymeric sheet, the second polymeric sheet, or the third polymeric sheet configures the first polymeric sheet and the second polymeric sheet so that a first fluid chamber comprises a volume bounded by the first polymeric sheet and the second polymeric sheet, and a second fluid chamber comprises a volume bounded by the second polymeric sheet and the third polymeric sheet. In such an embodiment, the method may further comprise inflating at least one of the first fluid chamber or the second fluid chamber. For example, if the first fluid chamber is isolated from the second fluid chamber, inflating at least one of the first fluid chamber or the second fluid chamber may comprise inflating the first fluid chamber to a first predetermined pressure, and inflating the second fluid chamber to a second predetermined pressure.

In an embodiment, forming at least one of the first polymeric sheet, the second polymeric sheet, or the third polymeric sheet to have a contoured surface profile comprises configures the second polymeric sheet so that a third fluid chamber comprises a volume bounded by the first polymeric sheet and the second polymeric sheet, and a fourth fluid chamber comprises a volume bounded by the second polymeric sheet and the third polymeric sheet. In such an embodiment, the third fluid chamber and the fourth fluid chamber are isolated from the first fluid chamber, from the second fluid chamber, or from one another, and inflating also comprises inflating the third fluid chamber to a third predetermined pressure, and the fourth fluid chamber to a fourth predetermined pressure. At least one of the first predetermined pressure, the second predetermined pressure, the third predetermined pressure, and the fourth predetermined pressure differs from another of the first predetermined pressure, the second predetermined pressure, the third predetermined pressure, and the fourth predetermined pressure.

The method may be used to manufacture a bladder element for an article of footwear or a bladder element for a different application. In an embodiment, the bladder element is included in a sole assembly of an article of footwear, and the bladder element comprises at least one of a forefoot portion, a midfoot portion, and a heel portion. If one embodiment in which the bladder element comprises a forefoot portion, a midfoot portion and a heel portion, the first fluid chamber extends over the second fluid chamber in the heel portion, and the third fluid chamber and the fourth fluid chamber are adjacent one another in the forefoot portion. Accordingly, using only three polymeric sheets, the bladder element may have different fluid chambers with different inflated pressures, and with the chambers layered above and below one another, and/or positioned side-by-side.

The method may further comprise monitoring pressures applied to an article of footwear during wear testing, and selecting at least some of the predetermined pressures based on the pressures applied. Stated differently, the predetermined inflation pressures of the chambers can be based on population averages of wear testing data, or on specific wear testing data from a specific customer.

The method may comprise securing the first surface of the second polymeric sheet to the inner surface of the first polymeric sheet, and the second surface of the second polymeric sheet to the inner surface of the third polymeric sheet while the second polymeric sheet, the first polymeric sheet, and the third polymeric sheet are in the mold assembly. The mold assembly may be a thermoforming and/or vacuuforming mold assembly, in which case the forming is thermoforming and/or vacuuforming. In one embodiment, the securing of the sheets is accomplished with first polymeric sheet and the second polymeric sheet free of anti-welding material, or with the second polymeric sheet and the third polymeric sheet free of anti-welding material, or with the first polymeric sheet, the second polymeric sheet, and the third polymeric sheet free of anti-welding material. By eliminating any step of placing anti-welding material between the polymeric sheets, the manufacturing process is simplified.

In one embodiment, forming at least one of the first polymeric sheet, the second polymeric sheet, or the third polymeric sheet with a contoured surface profile comprises forming the second polymeric sheet with the contoured surface profile. Securing the first surface of the second polymeric sheet to the inner surface of the first polymeric sheet and the second surface of the second polymeric sheet to the inner surface of the third polymeric sheet tethers the first polymeric sheet to the third polymeric sheet via the second polymeric sheet. Tethering of the first and third polymeric sheets via the second polymeric sheet is at specific locations so that the fluid chambers defined by the adjacent sheets and bounded by the tethers are positioned to provide a desired cushioning response.

Forming at least one of the first polymeric sheet, the second polymeric sheet, or the third polymeric sheet to have a contoured surface profile may comprise forming each of the first polymeric sheet, the second polymeric sheet, and the third polymeric sheet with a respective contoured surface profile.

In an embodiment, forming at least one of the first polymeric sheet, the second polymeric sheet, or the third polymeric sheet with a contoured surface profile comprises forming the third polymeric sheet with a cavity comprising an open side. In such an embodiment, the second polymeric sheet extends into the cavity from the open side. For example, the first and second polymeric sheets may be secured to one another prior to stacking with the third polymeric sheet in the mold assembly, and the second polymeric sheet with its contoured surface profile is then placed into the open cavity of the third polymeric sheet.

In an embodiment, forming at least one of the first polymeric sheet, the second polymeric sheet, or the third polymeric sheet with a contoured surface profile comprises forming the second polymeric sheet so that the second polymeric sheet at least partially defines a plurality of fluid chambers between the first polymeric sheet and the third polymeric sheet, and at least some of the plurality of fluid chambers are isolated from one another by the second polymeric sheet.

A bladder element comprises a first polymeric sheet, a second polymeric sheet, and a third polymeric sheet. At least one of the first, the second, and the third polymeric sheets is formed with a contoured surface profile. The first, the second, and the third polymeric sheets are stacked so that the second polymeric sheet is between the first polymeric sheet and the third polymeric sheet. A first surface of the second polymeric sheet may be in contact with an inner surface of the first polymeric sheet, or a second surface of the second polymeric sheet may be in contact with an inner surface of the third polymeric sheet, or both the first surface of the second polymeric sheet may be in contact with an inner surface of the first polymeric sheet, and the second surface of the second polymeric sheet may be in contact with the inner surface of the third polymeric sheet. Pressurized fluid may be between the first polymeric sheet and the second polymeric sheet, between the second polymeric sheet and the third polymeric sheet, or between the first polymeric sheet and the second polymeric sheet, and between the second polymeric sheet and the third polymeric sheet.

In an embodiment, the third polymeric sheet comprises a cavity with an open side, and the second polymeric sheet extends into the cavity from the open side.

In an embodiment, the bladder element is a bladder element of an article of footwear and comprises at least one of a forefoot portion, a midfoot portion and a heel portion. For example, in an embodiment, the first fluid chamber extends over the second fluid chamber in the heel portion, and the third fluid chamber and the fourth fluid chamber are adjacent one another in the forefoot portion.

In an embodiment, a first fluid chamber comprises a volume bounded by the first polymeric sheet and the second polymeric sheet, and a second fluid chamber comprises a volume bounded by the second polymeric sheet and the third polymeric sheet. The first fluid chamber is inflated to a first predetermined pressure and the second fluid chamber is inflated to a second predetermined pressure. In such an embodiment, the second polymeric sheet may be configured so that a third fluid chamber comprises another volume bounded by the first polymeric sheet and the second polymeric sheet, and a fourth fluid chamber comprises another volume bounded by the second polymeric sheet and the third polymeric sheet. The third fluid chamber and the fourth fluid chamber are isolated from the first fluid chamber, from the second fluid chamber, or from one another. The third fluid chamber has a third predetermined pressure and the fourth fluid chamber has a fourth predetermined pressure. At least one of the first predetermined pressure, the second predetermined pressure, the third predetermined pressure, and the fourth predetermined pressure differs from another of the first predetermined pressure, the second predetermined pressure, the third predetermined pressure, and the fourth predetermined pressure.

In an embodiment, the second polymeric sheet is configured so that a plurality of fluid chambers comprise volumes bounded by the first polymeric sheet and the second polymeric sheet, or by the second polymeric sheet and the third polymeric sheet, and at least some of the plurality of fluid chambers are isolated from one another by the second polymeric sheet.

In an embodiment, at least one of the first polymeric sheet, the second polymeric sheet, or the third polymeric sheet comprises a multi-layer polymeric sheet. For example, the multi-layer polymeric sheet may be a flexible micro-layer membrane that includes alternating layers of a gas barrier polymer material and an elastomeric material. The layers may include ethylene-vinyl alcohol copolymer, thermoplastic polyurethane, and a regrind material of the ethylene-vinyl alcohol copolymer and thermoplastic polyurethane.

In an embodiment, a bladder element comprises a first polymeric sheet, a second polymeric sheet, and a third polymeric sheet. The first, the second, and the third polymeric sheets are stacked with the second polymeric sheet between the first polymeric sheet and the third polymeric sheet. The second polymeric sheet has a contoured surface profile and is secured to at least one of an inner surface of the first polymeric sheet or an inner surface of the third polymeric sheet so that a first fluid chamber comprises a volume bounded by the first polymeric sheet and the second polymeric sheet, and a second fluid chamber comprises a volume bounded by the second polymeric sheet and the third polymeric sheet. The first fluid chamber is isolated from the second fluid chamber by the second polymeric sheet.

In an embodiment, the third polymeric sheet comprises a cavity with an open side. The second polymeric sheet extends into the cavity from the open side. For example, the second polymeric sheet may be entirely in the cavity and enclosed therein by the first polymeric sheet and the third polymeric sheet, and the first polymeric sheet may cover the open side.

The first polymeric sheet and the third polymeric sheet are relatively flat in comparison to the contoured surface profile of the second polymeric sheet. In an embodiment, the first polymeric sheet, the second polymeric sheet, and the third polymeric sheet are relatively flat in the heel portion in comparison to the contoured surface profile of the second polymeric sheet in the forefoot portion. For example, the first polymeric sheet and the third polymeric sheet may be relatively flat in comparison to the contoured surface profile of the second polymeric sheet.

In one embodiment, the first and the third polymeric sheets are secured only to the second polymeric sheet and not directly to one another. For example, the second polymeric sheet may be secured to the inner surface of the first polymeric sheet, and the second polymeric sheet may be secured to the inner surface of the third polymeric sheet.

In an embodiment, a first peripheral flange of the first polymeric sheet is secured to a second peripheral flange of the second polymeric sheet, and the second peripheral flange is secured to a third peripheral flange of the third polymeric sheet. For example, in one embodiment, the first peripheral flange, the second peripheral flange, and the third peripheral flange form a continuous peripheral flange that surrounds the bladder element. The contoured surface profile is between the continuous peripheral flange (i.e., laterally and longitudinally inward thereof), so that the second polymeric sheet is secured to the inner surface of the first polymeric sheet and/or the inner surface of the third polymeric sheet laterally and longitudinally inward of the continuous peripheral flange.

In an embodiment, the first polymeric sheet and the second polymeric sheet are free of anti-welding material, or the second polymeric sheet and the third polymeric sheet are free of anti-welding material, or the first polymeric sheet, the second polymeric sheet, and the third polymeric sheet are free of anti-welding material. Stated differently, the first polymeric sheet is secured to the second polymeric sheet without anti-welding material between the first polymeric sheet and the second polymeric sheet, the second polymeric sheet is secured to the third polymeric sheet without anti-welding material between the second polymeric sheet and the third polymeric sheet, or both the first polymeric sheet is secured to the second polymeric sheet without anti-welding material between the first polymeric sheet and the second polymeric sheet, and the second polymeric sheet is secured to the third polymeric sheet without anti-welding material between the second polymeric sheet and the third polymeric sheet.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Referring to the drawings, wherein like reference numbers refer to like features throughout the views, FIG. 1 shows a bladder element 10 having features that provide cushioning, stability, and responsiveness. The bladder element 10 may be for an article of footwear such as an athletic shoe, a dress shoe, a work shoe, a sandal, a slipper, a boot, or any other category of footwear. Alternatively, the bladder element 10 could be used as a cushioning element in another article, such as but not limited to a shoulder strap, a backpack, a shoulder pad, a glove, an elbow pad, a knee pad, a shin guard, or other apparel, or a sports ball.

The bladder element 10 comprises a forefoot portion 13, a midfoot portion 15, and a heel portion 17. For purposes of discussion, the forefoot portion 13 is generally the forwardmost third of the bladder element 10 when worn on a foot, the midfoot portion 15 is generally the middle third, and the heel portion 17 is generally the rearmost third. Heel portion 17 generally includes portions of the bladder element 10 corresponding with rear portions of a human foot of a size corresponding with the bladder element 10, including the calcaneus bone. Forefoot portion 13 generally includes portions of the bladder element 10 corresponding with the toes and the joints connecting the metatarsals with the phalanges of the human foot of the size corresponding with the bladder element 10. Midfoot portion 15 generally includes portions of the bladder element 10 corresponding with an arch area of the human foot of the size corresponding with the bladder element 10. More specifically, the bladder element 10 is referred to as a "full-length" bladder element 10 as it includes each of the forefoot portion 13, the midfoot portion 15, and the heel portion 17.

As used herein, a lateral side of a component for an article of footwear, such as a lateral side 18 of the bladder element 10 indicated in FIG. 1, is a side that corresponds with the side of the foot of the wearer of the article of footwear that is generally further from the other foot of the wearer (i.e., the side closer to the fifth toe of the wearer). The fifth toe is commonly referred to as the little toe. A medial side of a component for an article of footwear, such as a medial side 19 of the bladder element 10 indicated in FIG. 1, is the side that corresponds with an inside area of the foot of the wearer and is generally closer to the other foot of the wearer (i.e., the side closer to the hallux of the foot of the wearer). The hallux is commonly referred to as the big toe.

The bladder element 10 includes a first polymeric sheet 20, a second polymeric sheet 22, and a third polymeric sheet 24. As further discussed herein, and as indicated in FIG. 2, the bladder element 10 is formed from the three sheets 20, 22, 24 in a mold assembly 26 by thermoforming and/or vacuuforming (also referred to as vacuum forming). As indicated in FIG. 2, the mold assembly 26 includes a first or upper mold portion 26A and a second or lower mold portion 26B. The first, the second, and the third polymeric sheets 20, 22, 24 are stacked so that they are coextensive, and the second polymeric sheet 22 is between the first polymeric sheet 20 and the third polymeric sheet 24. As shown, the polymeric sheets 20, 22, 24 are coextensive when stacked. The sheets are "coextensive" if at least the portions of the sheets that will form the finished bladder element 10 (i.e., the portions of the sheets secured by and including the peripheral flanges 41A, 41B, 41C, not including any portions that can be trimmed following formation of the finished bladder element 10 of FIG. 4) are coextensive when stacked prior to formation in the mold assembly. Because the polymeric sheets 20, 22, 24 are coextensive, when formation of the bladder element 10 is complete, each polymeric sheet 20, 22, 24 contiguously extends between and forms the entire continuous peripheral flange (i.e., stacked flanges 41A, 41B, 41C) discussed herein.

As indicated in FIG. 2, the second polymeric sheet 22 is formed with a contoured surface profile P prior to placement between the first and third polymeric sheets 20, 24. For example, the second polymeric sheet 22 can be thermoformed, vacuuformed, or otherwise formed to establish the contoured surface profile P that includes a first set of surface portions 27 that extend in a first direction toward the first polymeric sheet 20, and a second set of surface portions 28 positioned between the surface portions 27, that extend in an opposite second direction toward the third polymeric sheet 24. Stated differently, the surface portions 27 on a first surface 30 of the second polymeric sheet 22 are those portions of the second polymeric sheet 22 that extend furthest toward an inner surface 32 of the first polymeric sheet 20. The surface portions 28 on a second surface 34 of the second polymeric sheet 22 are those portions of the second polymeric sheet 22 that extend furthest toward an inner surface 36 of the third polymeric sheet 24.

In contrast, the first and third polymeric sheets 20, 24 may be substantially flat sheets without contoured surfaces (i.e., with planar surfaces) when initially placed in the mold assembly 26, prior to the thermoforming and vacuum forming in the mold assembly 26. For example, the sheets 20, 24 may be cut so that the perimeters of the sheets 20, 24 have contoured curves, but the surfaces of the sheets 20, 24 are generally flat prior to forming on the mold assembly 26. The surfaces of the sheets 20, 24 may take on contoured shapes of the mold surfaces 40A, 40B when a vacuum is applied through a plurality of conduits 38 in the mold assembly 26 to conform the first polymeric sheet 20 to the mold surface 40A of the first mold portion 26A, and to conform the third polymeric sheet 24 to a mold surface 40B of the second mold portion 26B. Any or all of the polymeric sheets 20, 22, 24 may be preheated prior to placement in the mold assembly 26 to increase the formability of the sheets 20, 22, 24, and the ability of the sheets 20, 22, 24 to thermally bond to one another as discussed herein.

Various additional conduits in the mold assembly 26 also enable fluid communication with internal chambers within the bladder element 10 that are bounded at least partially by the second polymeric sheet 22 when the mold assembly 26 is in the closed position of FIG. 3. Such fluid conduits may be generally perpendicular to the cross-sectional views of FIGS. 2 and 3. For example, the mold surface 40A may have conduits 42A spaced along a perimeter of the mold surface 40A, and the mold surface 40B may have conduits 42B spaced along a perimeter of the mold surface 40B. When the first and third polymeric sheets 20, 24 are pulled against the mold surfaces 40A, 40B by the vacuum, small fill tubes are formed by the sheets 20, 24 at the conduits 42A, 42B, allowing fluid communication into chambers formed between the sheets 20, 22, and into chambers formed between the sheets 22, 24, as discussed herein.

When the mold assembly 26 is closed as shown in FIG. 3, fluid pressure can be introduced into the mold assembly 26 through the conduits 42A, such that the fluid pressure is applied to the first surface 30 of the second polymeric sheet 22. The fluid pressure on the first surface 30 forces the surface portions 28 of the second surface 34 of the second polymeric sheet 22 into contact with the inner surface 36 of the third polymeric sheet 24.

Similarly, fluid pressure can be introduced into the mold assembly 26 through the conduits 42B, such that the fluid pressure is applied to the second surface 34 of the second polymeric sheet 22. The fluid pressure on the second surface 34 forces the surface portions 27 of the first surface 30 of the second polymeric sheet 22 into contact with the inner surface 32 of the first polymeric sheet 20. In other embodiments, depending on the desired configuration of the bladder element, fluid pressure may be applied only between the first and second polymer sheets 20, 22, or may be applied only between the second and third polymeric sheets 22, 24. FIG. 3 shows arrows A representing fluid pressure introduced through conduits 42B forcing portions 27 of the first surface 30 against the inner surface 32, and shows arrows B representing fluid pressure introduced through conduits 42A forcing portions 28 of the second surface 34 against the inner surface 36.

Heat in the mold assembly 26 combined with the fluid pressure causes the second polymeric sheet 22 to be secured to the first polymeric sheet 20 by thermally bonding to the first polymeric sheet 20 at the portions 27 forced into contact with the inner surface 32, and to be secured to the third polymeric sheet 24 by thermally bonding to the third polymeric sheet 24 at the portions 28 forced into contact with the inner surface 36. The first polymeric sheet 20 is thus tethered to the third polymeric sheet 24 by the second polymeric sheet 22.

FIG. 1 shows a first peripheral flange 41A at a first perimeter P1 of the first polymeric sheet 20, a second peripheral flange 41B at a second perimeter P2 of the second polymeric sheet 22, and a third peripheral flange 41C at a third perimeter P3 of the third polymeric sheet 24. As shown in FIGS. 2-4, the flanges 41A, 41B, 41C are stacked so that the first peripheral flange 41A rests on the second peripheral flange 41B, and the second peripheral flange 41B rests on the third peripheral flange 41C. When heat and compression are applied by the mold assembly 26, the flange 41A is secured to the flange 41B, and the flange 41B is secured to the flange 41C so that the peripheral flanges 41A, 41B, 41C form a continuous peripheral flange that surrounds the bladder element 10. The first polymeric sheet 20 and the third polymeric sheet 24 are secured only to the second polymeric sheet 22 and not directly to one another, but they are tethered to one another by the second polymeric sheet 22. Adhesive and/or radio frequency welding may be used in some embodiments to secure the flanges 41A, 41B, 41C as described. The flanges 41A, 41B, 41C can be trimmed after the bladder element 10 is removed from the mold assembly 26, as shown in FIG. 4.

With reference to FIG. 4, after formation in the mold assembly 26, the bladder element 10 has a first fluid chamber 46A that comprises a volume bounded by the first polymeric sheet 20 and the second polymeric sheet 22. The bladder element 10 also has a second fluid chamber 46B that comprises a volume bounded by the second polymeric sheet 22 and the third polymeric sheet 24. The first fluid chamber 46A is not in fluid communication with the second fluid chamber 46B. In other words, the second polymeric sheet 22 isolates the first fluid chamber 46A from the second fluid chamber 46B.

Additionally, the second polymeric sheet 22 is configured so that a third fluid chamber 46C comprises a volume bounded by the first polymeric sheet 20 and the second polymeric sheet 22, and a fourth fluid chamber 46D comprises a volume bounded by the second polymeric sheet 22 and the third polymeric sheet 24. The first fluid chamber 46A is extends over (i.e., is above) the second fluid chamber 46B in the heel portion 17, and the third fluid chamber 46C and the fourth fluid chamber 46D are adjacent one another in the forefoot portion 13, with the fourth fluid chamber 46D forward of the third fluid chamber 46C. Stated differently, the chambers 46C and 46D are side-by-side, and not vertically stacked relative to one another. The third fluid chamber 46C and the fourth fluid chamber 46D are not in fluid communication with the first fluid chamber 46A, with the second fluid chamber 46B, or with one another. In other words, the second polymeric sheet 22 isolates the third fluid chamber 46C from the fourth fluid chamber 46D, and from the first and second fluid chambers 46A, 46B. The contoured surface profile P of the second polymeric sheet 22 enables this isolation of the fluid chambers and tethering of the first and third polymeric sheets 20, 24.

The same fill tubes formed by the polymeric sheets 20, 24 at the various conduits 42A, 42B can be used to inflate one or more of the fluid chambers 46A-46D, and then can be sealed to retain the fluid in the chambers. For example, in the embodiment of FIG. 4, the first fluid chamber 46A is inflated to a first predetermined pressure, and the second fluid chamber 46B is inflated to a second predetermined pressure that may be different from the first predetermined pressure. Additionally, the third fluid chamber 46C is inflated to a third predetermined pressure that may be different from the first or the second predetermined pressures, or both. The fourth fluid chamber 46D may also be inflated to a fourth predetermined pressure that may be different from any of all of the first, the second, or third predetermined pressures. In other words, at least one of the first predetermined pressure, the second predetermined pressure, the third predetermined pressure, and the fourth predetermined pressure differs from another of the first predetermined pressure, the second predetermined pressure, the third predetermined pressure, and the fourth predetermined pressure. The bladder element 10 also has additional fluid chambers 46E, 46F, 46G that are each isolated from the other fluid chambers by the second polymeric sheet 22. Any or all of these additional fluid chambers 46E, 46F, 46G can be inflated to respective predetermined pressures that are different from predetermined pressures in one or more of the other fluid chambers. As shown in FIGS. 1 and 4, the polymeric sheets 20, 22, 24 are relatively flat in the heel portion 17. In fact, the entire first polymeric sheet 20 and third polymeric sheet 24 are relatively flat in comparison to the second polymeric sheet 22 due to the preformed, contoured surface profile P of the second polymeric sheet 22, and the shape of the inner surfaces 40A, 40B of the mold assembly 60. In another embodiment, the first polymeric sheet 20 and the third polymeric sheet 24 could also each be formed with a respective contoured surface profile even prior to placement in the mold assembly 26 and application of fluid pressure thereto, so that each of the polymeric sheets 20, 22, 24 has a respective contoured surface profile, each of which can be different from one another.

Under the method, a pressure map of pressures applied during wear testing of a test article of footwear can be determined. The wear testing may be performed over a plurality of wearers, with the pressure map being a population average of the applied pressures of the tested wearers, or the pressure map may be of the applied pressures of only a particular wearer. In the latter case, the predetermined inflation pressures and resulting cushioning response of the bladder element 10 are thus customized to the particular wearer.

Figure 11:
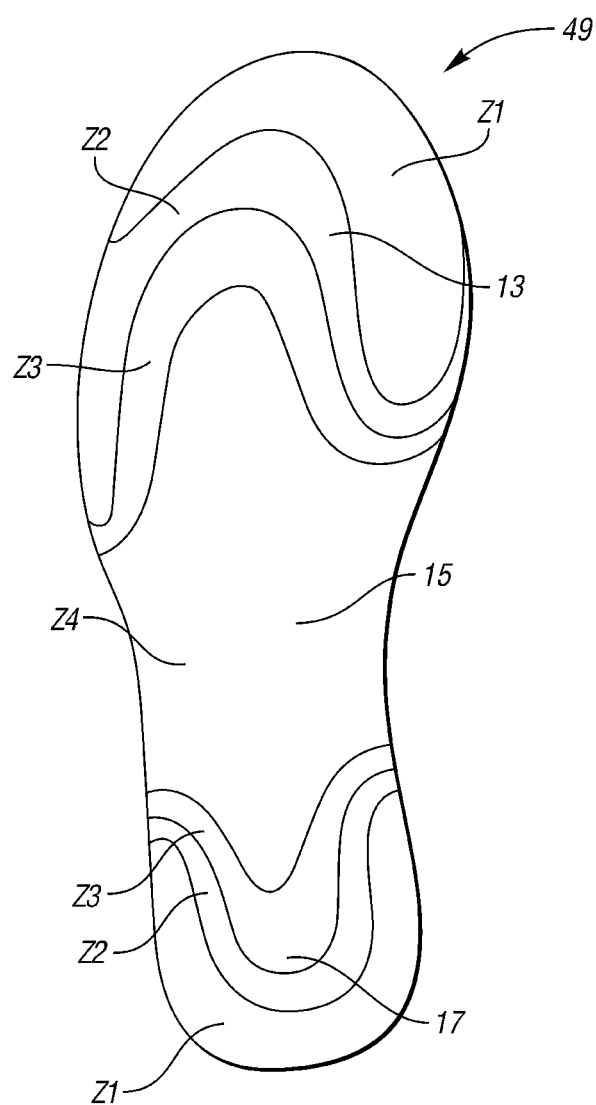
FIG. 11 is a schematic illustration of a predetermined map of pressures applied during wear testing of an article of footwear such as any of the articles of footwear of FIGS. 1-10.

For example, the pressures applied in a corresponding forefoot portion 13, midfoot portion 15, and heel portion 17 during wear of a test pair of an article of footwear can be monitored and determined. The article of footwear may have the bladder element 10 or 110, or may be a different article of footwear. An example of a pressure map 49 is shown in FIG. 11. The pressure map 49 shows various zones Z1, Z2, Z3, and Z4. Each zone Z1, Z2, Z3, and Z4 corresponds to a range of magnitudes of pressures experienced in the various portions 13, 15, 17. Zone Z1 represents a first range of magnitudes of pressures. Zone Z2 represents a second range of magnitudes of pressures less than the first range. Zone Z3 represents a third range of magnitudes of pressures less than the second range. Zone Z4 represents a fourth range of magnitudes of pressures less than the third range. At least some of the fluid chambers 46A-46F can be inflated to and can maintain predetermined pressures that are selected based on the pressure values of corresponding pressure Zones Z1-Z4. For example, the pressures in Zones Z1, Z2, and Z3 in the heel region 17 and in the forefoot region 13 are generally higher than the pressures in Zone Z4 in the midfoot 15. Fluid chambers 46A, 46B, 46D and 46G generally correspond to Zones Z1, Z2, and Z3 in the heel region 17 and in the forefoot region 13, and fluid pressures within those chambers may be selected to be higher than in the fluid chambers 46E, 46F, and 46G.

As used herein, a "fluid" includes a gas, including air, an inert gas such as nitrogen, or another gas. Accordingly, "fluid-filled" includes "gas-filled". The fluid used to force the second polymeric sheet 22 against the inner surfaces 32, 36, respectively, of the first and third polymeric sheets 20, 24 may be the same fluid that is used to inflate the chambers 46A-46G and which is then sealed in the chambers 46A-46G, or may be a different fluid. For example, air may be used to force the second polymeric sheet 22 against the inner surfaces 32, 36 of the first and third polymeric sheets 20, 24, but then the chambers 46A-46G may be filled and pressurized with another gas, and then the fill tubes can be sealed.

The various materials used for the bladder element 10, and other embodiments of bladder elements discussed herein, may be substantially transparent. As used herein, a component is "substantially transparent" if it has a luminous transmittance (i.e., a percentage of incident light that is transmitted) of at least 80 percent and haze (i.e., percentage of transmitted light that is scattered) of not more than 56 percent. Those skilled in the art will readily understand a variety of methods to determine luminous transmittance and haze of an object, such as the bladder element 10. Additionally, in some embodiments, the bladder element 10 may have a tinted color.

The fluid-filled bladder element 10 and other embodiments of bladder elements described herein can be formed from a variety of polymeric materials. For example, the bladder element 10 can be formed from any of various polymeric materials that can retain a fluid at a predetermined pressure, including a fluid that is a gas, such as air, nitrogen, or another gas. For example, the bladder element 10 can be a thermoplastic polymeric material. The bladder element 10 can be a urethane, polyurethane, polyester, polyester polyurethane, and/or polyether polyurethane.

Figure 10:
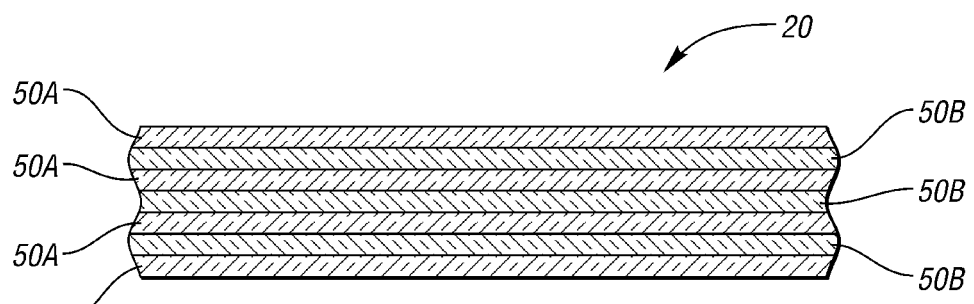
FIG. 10 is a schematic cross-sectional fragmentary illustration in close-up view of a portion of a polymeric sheet of the bladder element of FIG. 4.

Moreover, any or all of the polymeric sheets 20, 22, 24 used to form the bladder element 10 or other embodiments of bladder elements described herein can each in turn be formed of one or more sheets having layers of different materials. FIG. 10, which is a close-up, cross-sectional portion of the bladder element 10 taken at the cross-section shown in FIG. 1, shows that the bladder element 10 is a laminate membrane formed from thin films having one or more first layers 50A that comprise thermoplastic polyurethane layers and that alternate with one or more second layers 50B, also referred to herein as barrier layers, gas barrier polymers, or gas barrier layers, that comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The second and third polymeric sheets 22, 24 may be formed from the same materials shown and described in FIG. 10 with respect to the first polymeric sheet 20. The first layer 50A may be arranged to form an outer surface of the first polymeric sheet 20. That is, the outermost (top) first layer 50A shown in FIG. 10 may be the outer surface of the fluid-filled bladder element 10. The fluid-filled bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier polymer material such as second layers 50B and an elastomeric material such as first layers 50A, as disclosed in U.S. Pat. Nos. 6,082,025 and 6,127,026 to Bonk et al. which are incorporated by reference in their entireties. With such alternating layers, for example, the bladder element 10 or any of the additional bladder elements described herein may have a gas transmission rate for nitrogen of less than 10 cubic centimeters per square meter per atmosphere per day, or of less than 1 cubic centimeter per square meter per atmosphere per day. Additional suitable materials for the bladder element 10 are disclosed in U.S. Pat. Nos. 4,183,156 and 4,219,945 to Rudy which are incorporated by reference in their entireties. Further suitable materials for the bladder element 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 10, engineering properties such as tensile strength, stretch properties, fatigue characteristics, dynamic modulus, and loss tangent can be considered. The thicknesses of the first, second, and third polymeric sheets 20, 22, 24 of materials used to form the bladder element 10 can be selected to provide these characteristics.

Figure 5:
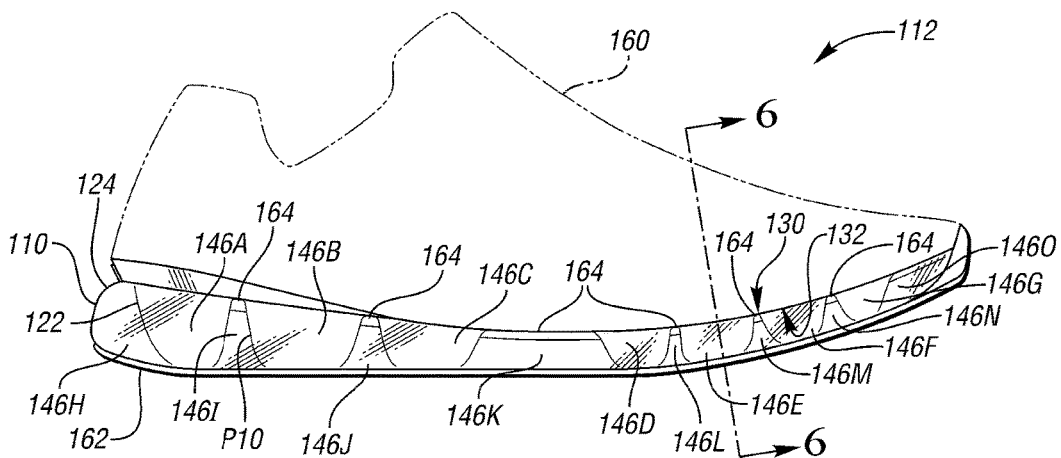
FIG. 5 is a schematic illustration in side view of an embodiment of a bladder element for an article of footwear, showing a footwear upper with phantom lines, in accordance with an alternative embodiment of the present teachings.

Next, the bladder element 10 can be secured to an upper either directly or indirectly. One embodiment of an upper 160 is shown in FIG. 5. The upper 160 can be secured to the bladder element 10 by various methods, such as adhesives, stitching, a combination of these methods, or otherwise. The upper 160 can include a strobel unit that can overlay and be adhered to the upper surface bladder element. Alternatively, the bladder element 10 can be secured to the upper 160 indirectly, such as via a midsole layer (not shown). The midsole layer may be an ethylene vinyl acetate (EVA) foam, or other type of cushioning material, that is in turn secured to the upper 160.

Figure 6:
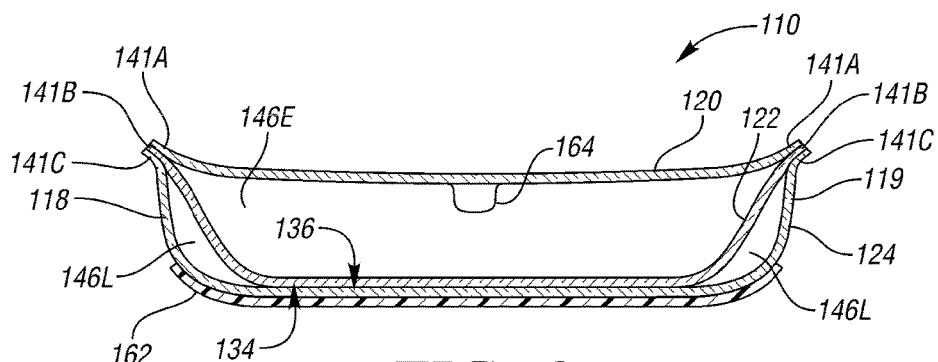
FIG. 6 is a schematic cross-sectional illustration of the bladder element of FIG. 5 taken at lines 6-6 in FIG. 5.

An outsole, such as an outsole 162 shown in FIGS. 5 and 6, may then be secured to the bladder element 10. The outsole 162 can be a single, continuous, integral component that covers the entire ground-facing surface of the bladder element 10. Alternatively, discrete outsole elements can be secured at different areas of the ground-facing surface of the bladder element 10. The outsole 162 can be a high wear material, such as a durable rubber.

FIGS. 5 and 6 show another embodiment of a bladder element 110 included in an article of footwear 112 that may be formed according to the same method described with respect to FIG. 1. The bladder element 110 is formed from a first polymeric sheet 120, a second polymeric sheet 122, and a third polymeric sheet 124. The second polymeric sheet 122 is formed to have a contoured surface profile P10, even prior to placing the sheets 120, 122, 124 in a mold assembly similar to mold assembly 26. The first polymeric sheet 120, the second polymeric 122, and the third polymeric sheet 124 are stacked in the mold assembly so that the three sheets are co-extensive and the second polymeric sheet 122 is between the first polymeric sheet 120 and the third polymeric sheet 124. More specifically, a flange 141A at a perimeter of the first polymeric sheet 120 is secured to a flange 141B at a perimeter of the second polymeric sheet 122, and the flange 141B is secured to the flange 141C of the third polymeric sheet 124. Fluid pressure is applied between the first polymeric sheet 120 and second polymeric sheet 122, between the second polymeric sheet 122 and the third polymeric sheet 124, or between both, to force a first surface 130 of the second polymeric sheet 122 into contact with an inner surface 132 of the first polymeric sheet 120, and a second surface 134 of the second polymeric sheet 122 into contact with an inner surface 136 of the third polymeric sheet 124 (as shown in FIG. 6). The second polymeric sheet 122 is then secured to the first and third polymeric sheets 122, 124 by thermal bonding at those portions forced into contact with one another by fluid pressure. No anti-welding material is used or required between any of the first, second, and third polymeric sheets 120, 122, 124. The stacked flanges 141A, 141B, 141C of the polymeric sheets 120, 122, 124 are secured to one another by thermal bonding, compression, adhesives, or RF welding to form a continuous peripheral flange and the bladder element 110. The first polymeric sheet 120 and the third polymeric sheet 124 are secured only to the second polymeric sheet 122 and not directly to one another. They are tethered to one another by the second polymeric sheet 122.

In the embodiment of FIGS. 5 and 6, the contoured surface profile P10 of the second polymeric sheet 122 creates channels 164 that interconnect the fluid chambers 146A, 146B, 146C, 146D, 146E, 146F, and 146G formed by and between the first polymeric sheet 120 and the second polymeric sheet 122. Each of the chambers 146A-146G is a respective volume bounded by the first polymeric sheet 120 and the second polymeric sheet 122. Because the fluid chambers 146A-146G can be in fluid communication with one another by the channels 164, all of the fluid chambers 146A-146G are at the same fluid pressure. In other words, the chambers 146A-146G can be inflated to a predetermined pressure through one or more conduits similar to any of the conduits 42A of FIG. 1, with the conduit or conduits then sealed, and all fluid chambers 146A-146G will then be at the same predetermined pressure. Alternatively, each of the chambers 146A-146G can be inflated individually, with the adjacent channel 164 then plugged, so that some or all of the chambers 146A-146G can be inflated to and can maintain different predetermined fluid pressures. The fluid pressures of the chambers 146A-146G may be selected based on the pressure map 49 as described with respect to the bladder element 10.

As shown in FIG. 6, the second polymeric sheet 122 does not extend completely to the inner surface 136 of the third polymeric sheet 124 at the lateral side 118 and the medial side 119, as evidenced by the fluid chambers 146L between the third polymeric sheet 124 and the second polymeric sheet 122 at the cross-section shown. If the contoured profile P10 of the second polymeric sheet 122 is formed in a like manner as this (i.e., not extending completely from the lateral side 118 to the medial side 119) from the forefoot region 13 to the heel region 17, then each of the fluid chambers 146H-146O formed by and between the second polymeric sheet 122 and the third polymeric sheet 124 will be in fluid communication with one another at the same fluid pressure. Each of the chambers 146H-146O is a volume bounded by the second polymeric sheet 122 and the third polymeric sheet 124. Because the chambers 146H-146O are in fluid communication with one another, the chambers 146H-146O can be inflated to a predetermined pressure through one or more conduits similar to any of the conduits 42B of FIG. 1, with the conduit or conduits then sealed, and all fluid chambers 146H-146O will then be at the same predetermined pressure, which may be different than the predetermined pressure of the fluid chambers 146A-146G.

Figure 7:
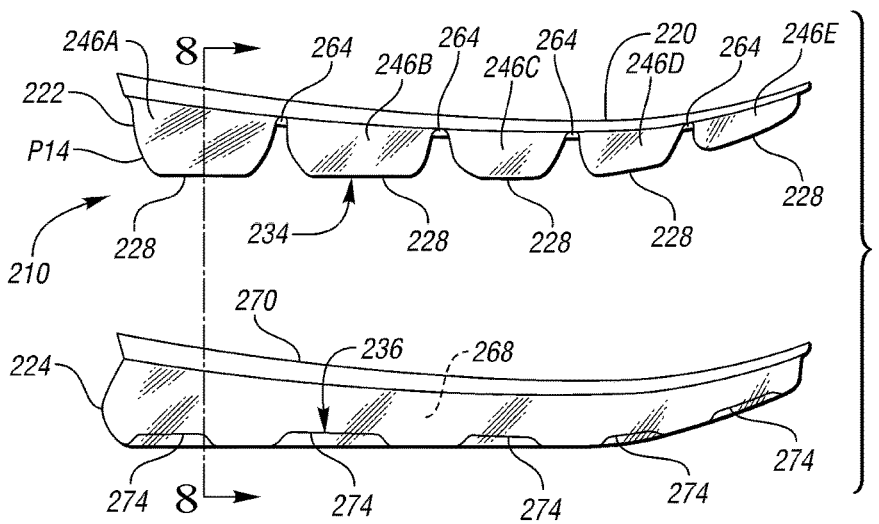
FIG. 7 is a schematic illustration in partially exploded side view of a bladder element for an article of footwear in accordance with another alternative embodiment of the present teachings.
Figure 8:
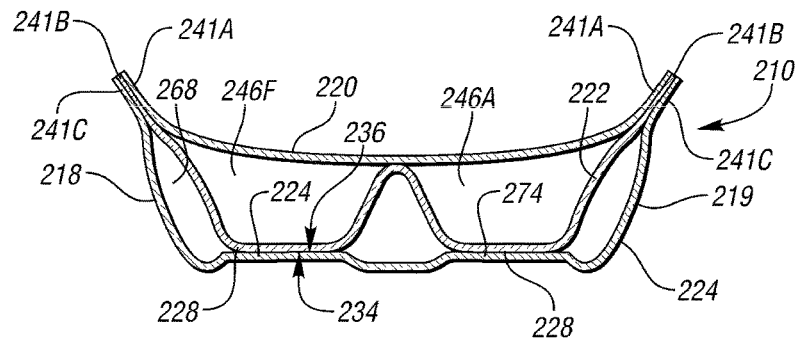
FIG. 8 is a schematic cross-sectional illustration of the bladder element of FIG. 7 taken at lines 8-8 in FIG. 7.
Figure 9:
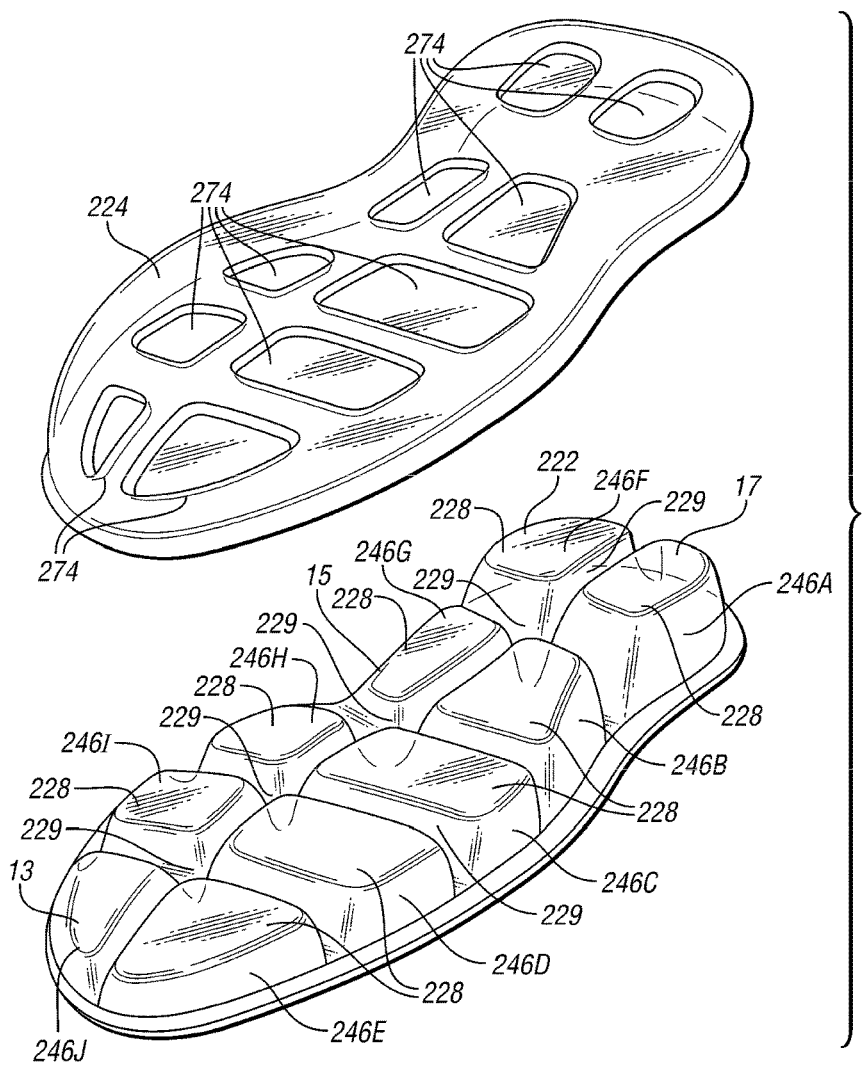
FIG. 9 is a schematic illustration in partially exploded perspective view of the bladder element of FIGS. 7 and 8.

FIGS. 7-9 show another embodiment of a bladder element 210 which can be included in an article of footwear. The bladder element 210 is formed from a first polymeric sheet 220, a second polymeric sheet 222, and a third polymeric sheet 224. The second polymeric sheet 222 is formed with a contoured surface profile P14. The third polymeric sheet 224 is formed to have a cavity 268 having an open side 270. The first and second polymeric sheets 220, 222 are formed separately from the third polymeric sheet 224, and are bonded to one another to enclose a plurality of fluid chambers 246A, 246B, 246C, 246D, and 246E that are fluidly connected with one another by channels 264 formed by the second polymeric sheet 222.

As indicated, the second polymeric sheet 222 is bonded to the first polymeric sheet 220 and is formed to have a contoured surface profile P14, including formed protrusions 228, even prior to placing the second polymeric sheet 222 to extend into the cavity 268 as indicated in FIG. 8. When positioned to extend into the cavity 268, the second polymeric sheet 222 is entirely in the cavity 268 and enclosed therein by the first polymeric sheet 220 and the third polymeric sheet 224 when the first polymeric sheet 220 covers the open side 270. The first polymeric sheet 220 and second polymeric 222 are stacked on the third polymeric sheet 224 in a mold assembly similar to mold assembly 26, so that the three sheets are co-extensive and the second polymeric sheet 222 is between the first polymeric sheet 220 and the third polymeric sheet 224. More specifically, a flange 241A at a perimeter of the first polymeric sheet 220 is stacked on a flange 241B at a perimeter of the second polymeric sheet 222, and the flange 241B is stacked on a flange 241C of the third polymeric sheet 224. Fluid pressure is applied between the first polymeric sheet 220 and second polymeric sheet 222, between the second polymeric sheet 222 and the third polymeric sheet 224, or between both, to force a surface 234 of the second polymeric sheet 222 into contact with an inner surface 236 of the third polymeric sheet 224. The second polymeric sheet 222 is then secured to the first and third polymeric sheets 222, 224 by thermal bonding at those portions of the formed protrusions 228 that are forced into contact with the third polymeric sheet 224 by fluid pressure that can be introduced through conduits similar to conduits 42B of FIG. 1. No anti-welding material is used or required between any of the first, second, and third polymeric sheets 220, 222, 224. The stacked peripheral flanges 241A, 241B, 241C of the polymeric sheets 220, 222, 224 are secured to one another by thermal bonding, compression, adhesives, or RF welding so that the peripheral flanges 241A, 241B, 241C form a continuous peripheral flange around the bladder element 210. The first polymeric sheet 220 and the third polymeric sheet 224 are secured only to the second polymeric sheet 222 and not directly to one another, but are tethered to one another by the second polymeric sheet 222.

In the embodiment of FIGS. 7-9, the contoured surface profile P14 of the second polymeric sheet 222 includes channels 264 that interconnect the fluid chambers 246A, 246B, 246C, 246D, 246E, 246F, 246G, 246H, 246I, 246J formed by and between the first polymeric sheet 220 and the second polymeric sheet 222. Each of the chambers 246A-246J is a volume bounded by the first polymeric sheet 220 and the second polymeric sheet 222. Because the fluid chambers 246A-246J are in fluid communication with one another by the channels 264, all of the fluid chambers 246A-246J are at the same fluid pressure. In other words, the chambers 246A-246J can be inflated to a predetermined pressure through one or more conduits similar to any of the conduits 42A of FIG. 1, with the conduit or conduits then sealed, and all fluid chambers 246A-246J will then be at the same predetermined pressure. Alternatively, each of the chambers 246A-246J can be inflated individually, with the adjacent channel 264 then plugged, so that some or all of the chambers 246A-246J can be inflated to and can maintain different predetermined fluid pressures. The fluid pressures of the chambers 246A-246J may be selected based on the pressure map 49 as described with respect to the bladder element 10.

As shown in FIG. 8, the second polymeric sheet 222 does not extend completely to the inner surface 236 of the third polymeric sheet 224 at the lateral side 218 and the medial side 219. Additionally, the second polymeric sheet 222 forms spaces 229 (i.e., voids) surrounding each of the protrusions 228 and that form a continuous volume around the protrusions 228 between the second polymeric sheet 222 and the third polymeric sheet 224. The spaces 229 are in fluid communication with one another. The third polymeric sheet 224 is vacuuformed and/or thermoformed in a mold assembly similar to mold assembly 26 to have a contoured surface profile with protrusions 274 that extend toward the protrusions 228 of the second polymeric sheet 222 when the second polymeric sheet 222 is positioned in the mold assembly 26 to extend into the cavity 268. The protrusions 274 contact the protrusions 228 so that the surface 234 thermally bonds to the inner surface 236.

The continuous volume around the protrusions 228 between the second polymeric sheet 222 and the third polymeric sheet 224 (i.e., the volume of the spaces 229) can be inflated to a predetermined pressure through one or more conduits similar to any of the conduits 42B of FIG. 1, with the conduit or conduits then sealed, and the volume between the second and third polymeric sheets 222, 224 will then be at the same predetermined pressure, which may be different than the predetermined pressure(s) of the fluid chambers 246A-246J.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

What is claimed is:

1. A method of manufacturing a bladder element comprising:
    forming at least one of a first polymeric sheet, a second polymeric sheet, or a third polymeric sheet with a contoured surface profile;
    after said forming, stacking the first polymeric sheet, the second polymeric sheet, and the third polymeric sheet in a mold assembly so that the second polymeric sheet is between the first polymeric sheet and the third polymeric sheet; and
    applying fluid pressure in the mold assembly:
        between the second polymeric sheet and the third polymeric sheet, forcing a first surface of the second polymeric sheet into contact with an inner surface of the first polymeric sheet, or
        between the first polymeric sheet and second polymeric sheet, forcing a second surface of the second polymeric sheet into contact with an inner surface of the third polymeric sheet, or
        between the first polymeric sheet and second polymeric sheet, and between the second polymeric sheet and the third polymeric sheet, forcing both the second surface of the second polymeric sheet into contact with the inner surface of the third polymeric sheet, and the first surface of the second polymeric sheet into contact with the inner surface of the first polymeric sheet.

2. The method of claim 1, wherein said forming is by thermoforming.

3. The method of claim 1, further comprising:
    securing a flange at a perimeter of at least one of the first polymeric sheet, the second polymeric sheet, and the third polymeric sheet, to a flange at a perimeter of another of the first polymeric sheet, the second polymeric sheet, and the third polymeric sheet by at least one of compression, radio-frequency welding, thermal bonding, or adhesive.

4. The method of claim 1, wherein said forming configures the first polymeric sheet and the second polymeric sheet so that:
    a first fluid chamber comprises a volume bounded by the first polymeric sheet and the second polymeric sheet;
    a second fluid chamber comprises a volume bounded by the second polymeric sheet and the third polymeric sheet; and
    the method further comprising:
    inflating at least one of the first fluid chamber or the second fluid chamber.

5. The method of claim 4, wherein the first fluid chamber is isolated from the second fluid chamber, and said inflating comprises inflating the first fluid chamber to a first predetermined pressure, and inflating the second fluid chamber to a second predetermined pressure.

6. The method of claim 5, wherein:
    said forming configures the second polymeric sheet so that a third fluid chamber comprises a volume bounded by the first polymeric sheet and the second polymeric sheet, and a fourth fluid chamber comprises a volume bounded by the second polymeric sheet and the third polymeric sheet;
    the third fluid chamber and the fourth fluid chamber are isolated from the first fluid chamber, from the second fluid chamber, or from one another;
    said inflating comprises inflating the third fluid chamber to a third predetermined pressure, and the fourth fluid chamber to a fourth predetermined pressure; and
    at least one of the first predetermined pressure, the second predetermined pressure, the third predetermined pressure, and the fourth predetermined pressure differs from another of the first predetermined pressure, the second predetermined pressure, the third predetermined pressure, and the fourth predetermined pressure.

7. The method of claim 6, further comprising:
securing the bladder element to an article of footwear; wherein the bladder element comprises at least one of a forefoot portion, a midfoot portion, and a heel portion.

8. The method of claim 7, wherein:
the bladder element comprises a forefoot portion, a midfoot portion and a heel portion;
the first fluid chamber extends over the second fluid chamber in the heel portion; and
the third fluid chamber and the fourth fluid chamber are adjacent one another in the forefoot portion.

9. The method of claim 5, further comprising:
monitoring pressures applied to an article of footwear during wear testing; and
selecting at least some of the predetermined pressures based on the pressures applied.

10. The method of claim 1, wherein:
the mold assembly is a thermoforming and/or vacuuforming mold assembly;
said forming is thermoforming and/or vacuuforming; and further comprising securing:
  the first surface of the second polymeric sheet to the inner surface of the first polymeric sheet, and
  the second surface of the second polymeric sheet to the inner surface of the third polymeric sheet while the second polymeric sheet, the first polymeric sheet, and the third polymeric sheet are in the mold assembly.

11. The method of claim 10, wherein said securing is with:
the first polymeric sheet and the second polymeric sheet free of anti-welding material, or
the second polymeric sheet and the third polymeric sheet free of anti-welding material, or
the first polymeric sheet, the second polymeric sheet, and the third polymeric sheet free of anti-welding material.

12. The method of claim 10, wherein:
said forming at least one of the first polymeric sheet, the second polymeric sheet, or the third polymeric sheet with a contoured surface profile comprises forming the second polymeric sheet with the contoured surface profile; and
said securing the first surface of the second polymeric sheet to the inner surface of the first polymeric sheet and the second surface of the second polymeric sheet to the inner surface of the third polymeric sheet tethers the first polymeric sheet to the third polymeric sheet.

13. The method of claim 1, wherein said forming at least one of the first polymeric sheet, the second polymeric sheet, or the third polymeric sheet with a contoured surface profile comprises forming each of the first polymeric sheet, the second polymeric sheet, and the third polymeric sheet with a respective contoured surface profile.

14. The method of claim 1, wherein:
said forming comprises forming the third polymeric sheet with a cavity comprising an open side; and
the second polymeric sheet extends into the cavity from the open side.

15. The method of claim 1, wherein:
said forming at least one of the first polymeric sheet, the second polymeric sheet, or the third polymeric sheet with a contoured surface profile comprises forming the second polymeric sheet so that the second polymeric sheet at least partially defines a plurality of fluid chambers between the first polymeric sheet and the third polymeric sheet; and
at least some of the plurality of fluid chambers are isolated from one another by the second polymeric sheet.

* * * * *